United States Patent [19]
Sorenson

[11] Patent Number: 5,854,461
[45] Date of Patent: Dec. 29, 1998

[54] WELDING SHIELD

[76] Inventor: Jared T. Sorenson, 19841-A River Rd., Gladstone, Oreg. 97027

[21] Appl. No.: 848,692

[22] Filed: Apr. 29, 1997

Related U.S. Application Data

[60] Provisional application No. 60/030,326 Nov. 1, 1996.

[51] Int. Cl.$^6$ ..................................................... B23K 9/29
[52] U.S. Cl. ...................................... 219/136; 219/137.43
[58] Field of Search ..................................... 219/138, 136, 219/137.2, 137.31, 137.42, 137.43, 137 R

[56] References Cited

U.S. PATENT DOCUMENTS

| | | | |
|---|---|---|---|
| 3,597,576 | 8/1971 | Bernard et al. | 219/130 |
| 3,728,514 | 4/1973 | Bernard et al. | 219/130 |
| 4,891,489 | 1/1990 | Bollinger et al. | 219/121.48 |
| 5,241,154 | 8/1993 | Estrate | 219/147 |

*Primary Examiner*—Clifford C. Shaw
*Attorney, Agent, or Firm*—Stoel Rives LLP

[57] ABSTRACT

A shield for the protection of a welder's gloved hand and/or a welding instrument during a welding operation is provided having dual plates that define an air channel that allows a cooling flow of air through the air channel and past the plate that is in closest proximity to the welding operation.

8 Claims, 5 Drawing Sheets

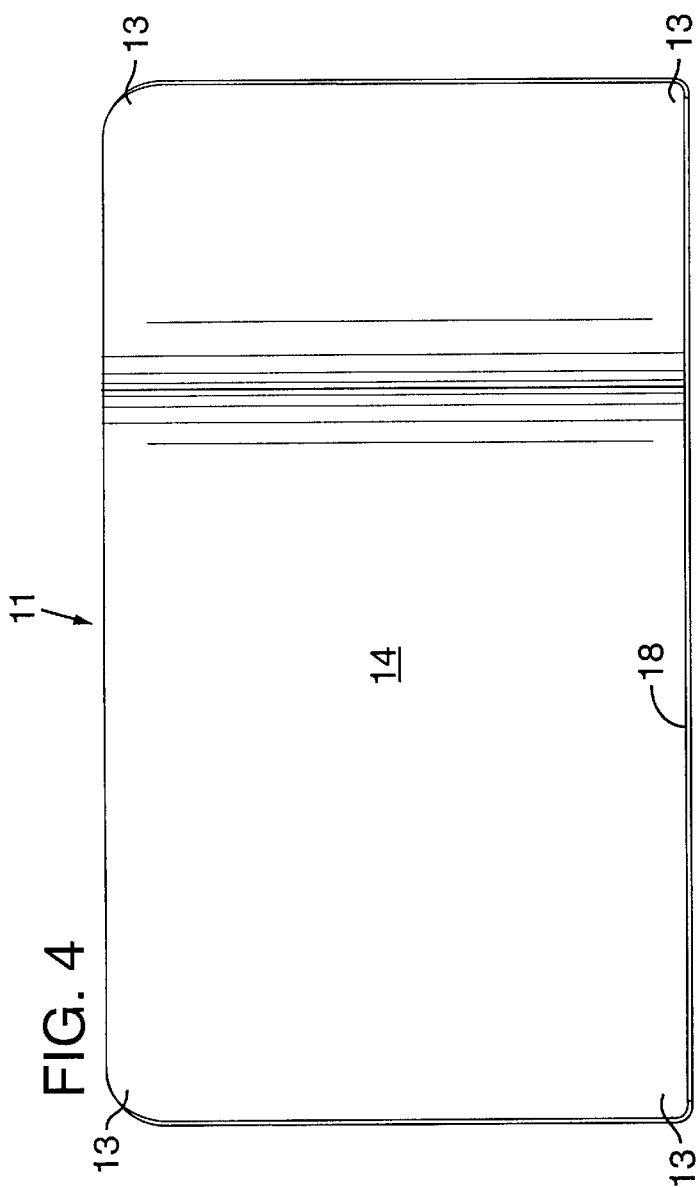
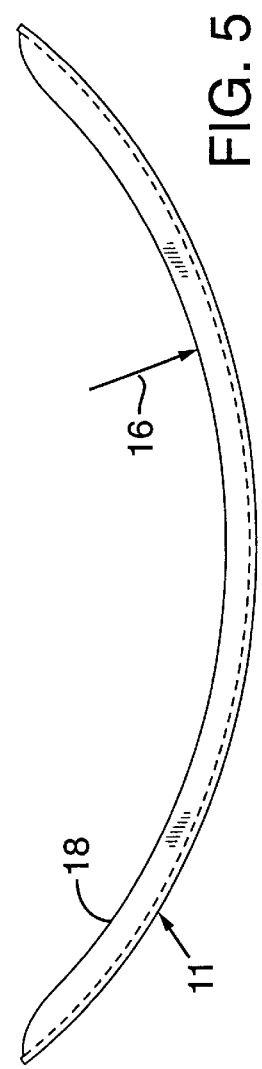
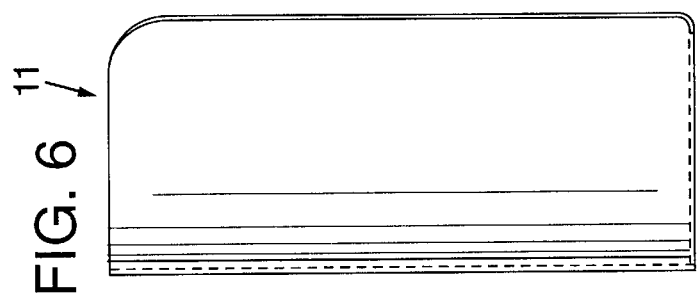

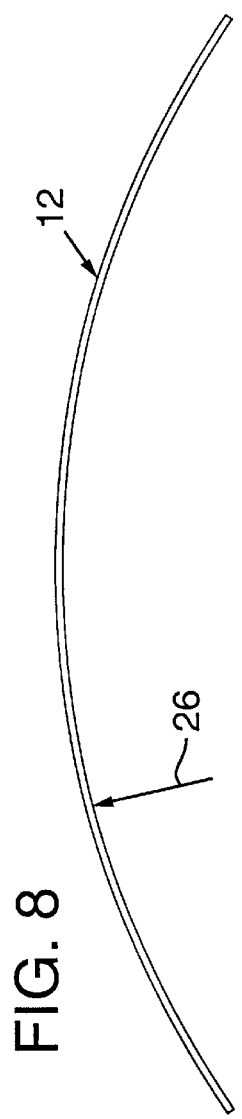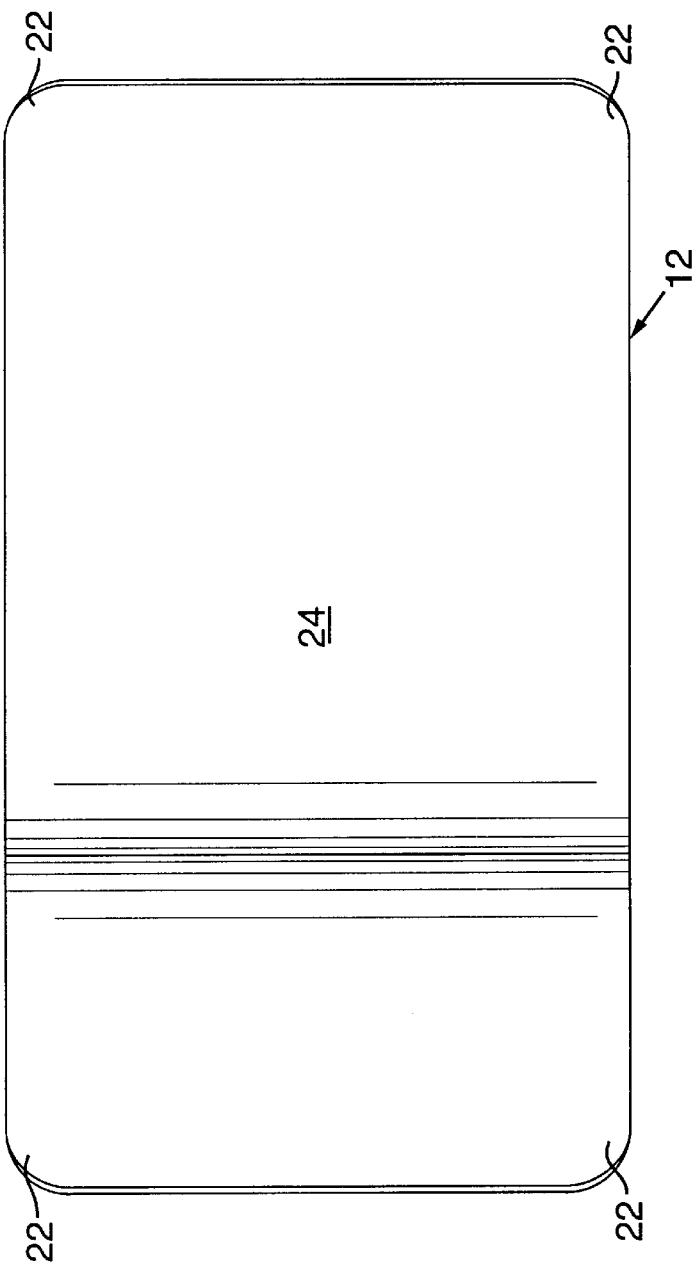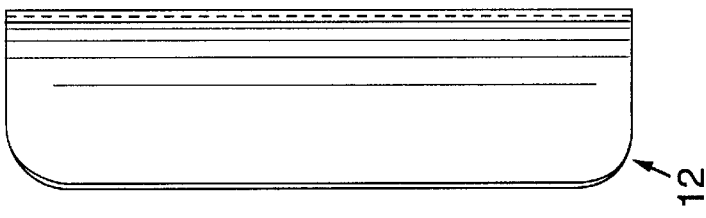

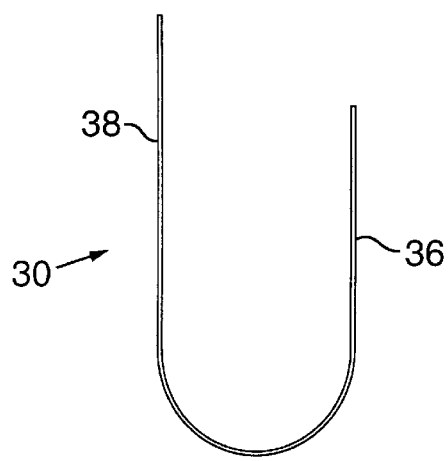
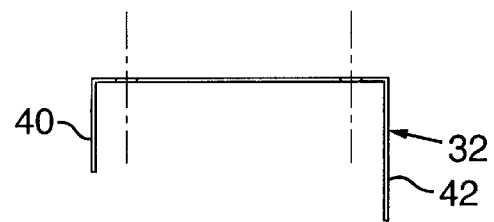
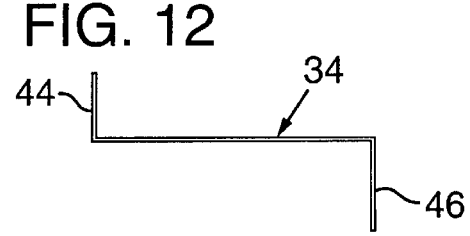
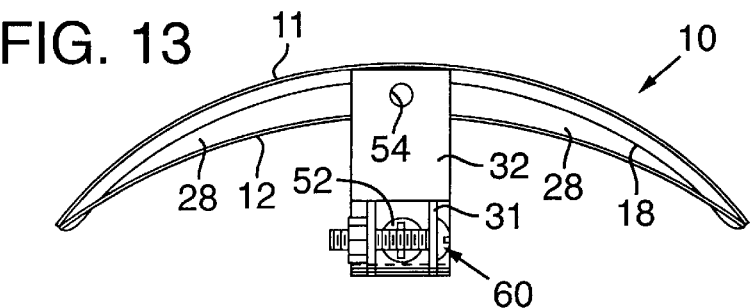
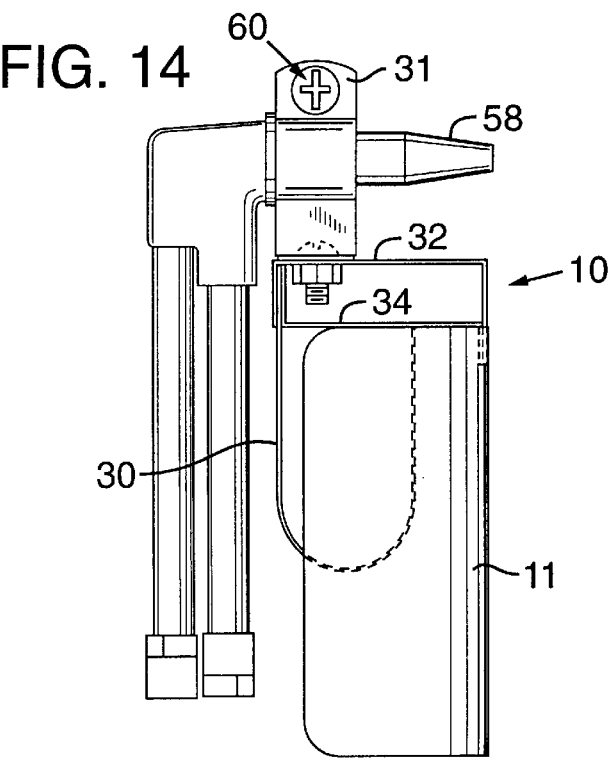

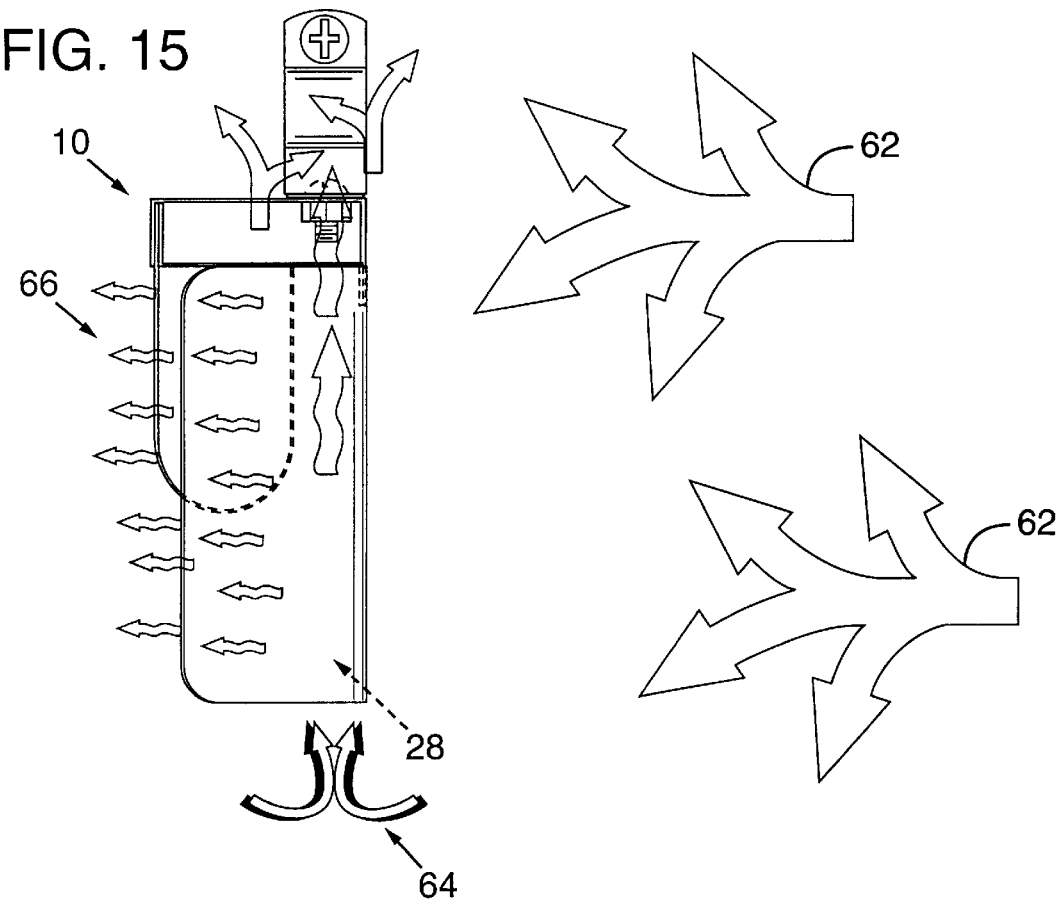

WELDING SHIELD

This is a provisional application Ser. No. 60/030,326 filed Nov. 1, 1996.

TECHNICAL FIELD

The present invention relates to the field of protective equipment for use during welding.

BACKGROUND OF THE INVENTION

Welders typically use fire retardant fabric or leather gloves to protect their hands from heat, sparks, and welding slag produced by the welding operation. Unfortunately, the sparks and welding slag from the welding operation can destroy several gloves during a welder's work shift. The heat of the welding operation can also cause leather gloves to shrink, rendering them uncomfortable and unusable. Gloves can, therefore, be a significant expense in a welding shop.

Moreover, leather and fabric gloves provide inadequate protection from the heat produced by the welding operation. A welder's hand can therefore become uncomfortably hot during welding, particularly when welding in closed quarters. When a welder's hand becomes too hot, the welder must then either hurry to finish off a particular weld, thereby possibly adversely affecting the quality of the weld, or stop welding and remove his hand from the heat to let it cool off. Stopping the welding operation in the middle of a weld can also have an adverse affect on the quality of the weld.

SUMMARY OF THE INVENTION

An object of the invention is to protect a welder's hands, gloves, and other welding equipment from damage during the welding operation.

Another object of the invention is reduce welding expense by protecting welding gloves.

A further object of the invention is to improve the quality of welding by improving a welder's ability to complete a weld without rushing or interrupting the welding operation to cool his hand.

Yet another object of the invention is to improve the quality of welding by allowing a welder to weld at a higher temperature without discomfort.

Still another object of the invention is to provide fixturing for the welding instrument to produce straighter welds.

The invention is directed to a welding shield that protects the hands and/or gloves of a welder as well as the welding equipment used during welding and cutting operations. Although the invention is used primarily with continuous (wire feed) electrode arc welders and oxyacetylene welding or cutting torches, it can also be used with many different types of gas and arc welding and cutting methods, such as oxyacetylene, gas metal arc (MIG), gas tungsten arc (TIG), shielded metal arc (stick electrode), submerged arc, flux cored electrode, and plasma arc.

The welding shield is preferably of a double wall construction having two plates, a front plate positioned toward the work piece being welded and a rear plate positioned toward the welder's hand. The front plate and the rear plate form between them an air channel that allows air to flow between the plates. The front plate is preferably constructed from a lightweight, heat conducting material, such as a sheet metal, that is relatively impervious to sparks and welding slag.

During the welding operation, the front plate reflects a portion of the radiant heat from the welding operation and absorbs a portion of the radiant and otherwise transferred heat. As the temperature of the front plate rises, air adjacent to the front plate warms by conduction and rises, causing cooler room air to be drawn into the air channel. The flow of cooler room air into the air channel cools both the front plate and the rear plate, and the rear plate remains at a temperature significantly lower than that of the front plate, thereby insulating the welder's hand from the heat of the welding operation.

The welding shield is adapted for different manners of use. For example, in one manner of use the welding shield may be hand held by the welder with one hand while the welding instrument is held in the welder's other hand. When the welding shield is hand held it may by used to provide additional support for the welding instrument. The welding shield can be used as an adjustable fixturing tool for making straight welds and cuts.

In another manner of use, the welding shield may be mounted to the welding instrument by a clamp. The clamp can preferably be positioned in different locations on the welding shield for conveniently mounting it on different types of welding instruments. The preferred clamp also allows the welding shield to be rotated and fixed in different orientations with respect to the welding instrument to protect the welder's hand and equipment over a range of different welding situations.

By allowing the welder's hand to keep cool and eliminating the need for a welder to rush through certain welds, the quality of welding is improved. The shield also allows the welder the option of welding at a higher temperature without being concerned about keeping his hands cool and destroying gloves more rapidly.

Additional objects and advantages of this invention will be apparent from the following detailed description of a preferred embodiments thereof that proceeds with reference to the accompanying drawings.

BRIEF DESCRIPTION OF THE DRAWINGS

FIG. 4 is a rear elevation view a front plate of the welding shield of FIG. 1.

FIG. 5 is a bottom view of the front plate of FIG. 4.

FIG. 6 is a side elevation view of the front plate of FIG. 4.

FIG. 7 is a rear elevation view of a rear plate of the welding shield of FIG. 1.

FIG. 8 is a top view of the rear plate of FIG. 7.

FIG. 9 is a side elevation view of the rear plate of FIG. 7.

FIG. 10 is a side elevation view of a handle.

FIG. 11 is a side elevation view of a clamp support.

FIG. 12 is a side elevation view of an additional support.

FIG. 13 is a top plan view of the welding shield of FIG. 1 with the clamp shown in a different position.

FIG. 14 is a side elevation view of the welding shield of FIG. 13 shown mounted on a cutting torch.

FIG. 15 is a diagrammatic view showing airflow around the welding shield.

DETAILED DESCRIPTION OF PREFERRED EMBODIMENT

Figure 1:
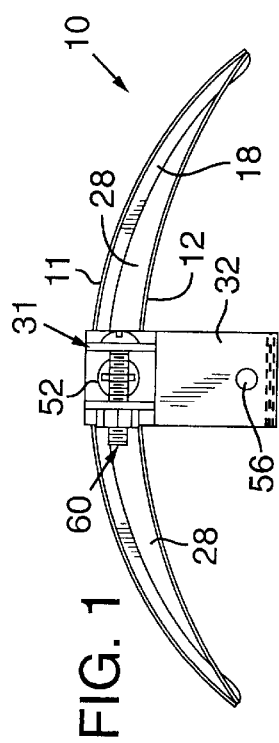
FIG. 1 is a top view of a preferred embodiment of a welding shield of the present invention.
Figure 2:
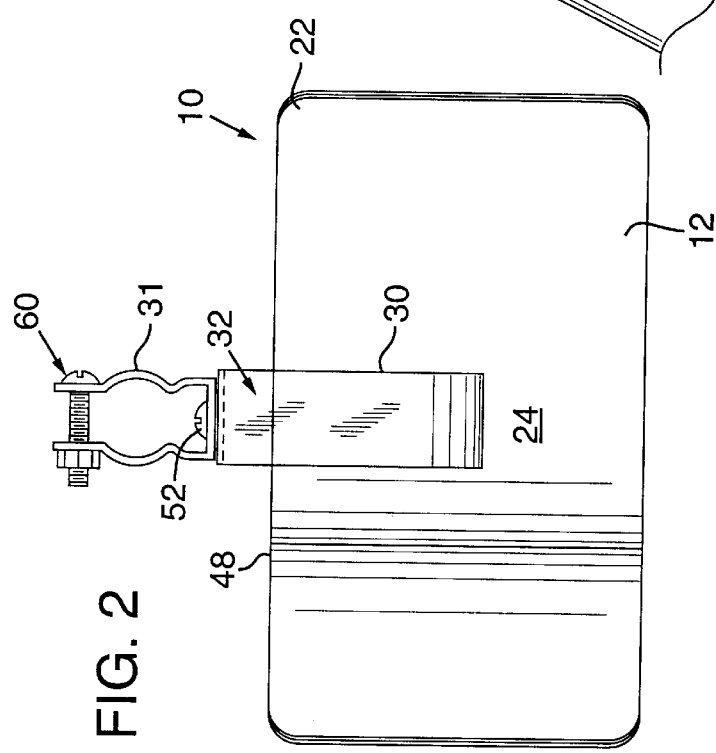
FIG. 2 is a rear elevation view of the welding shield of FIG. 1.
Figure 3:
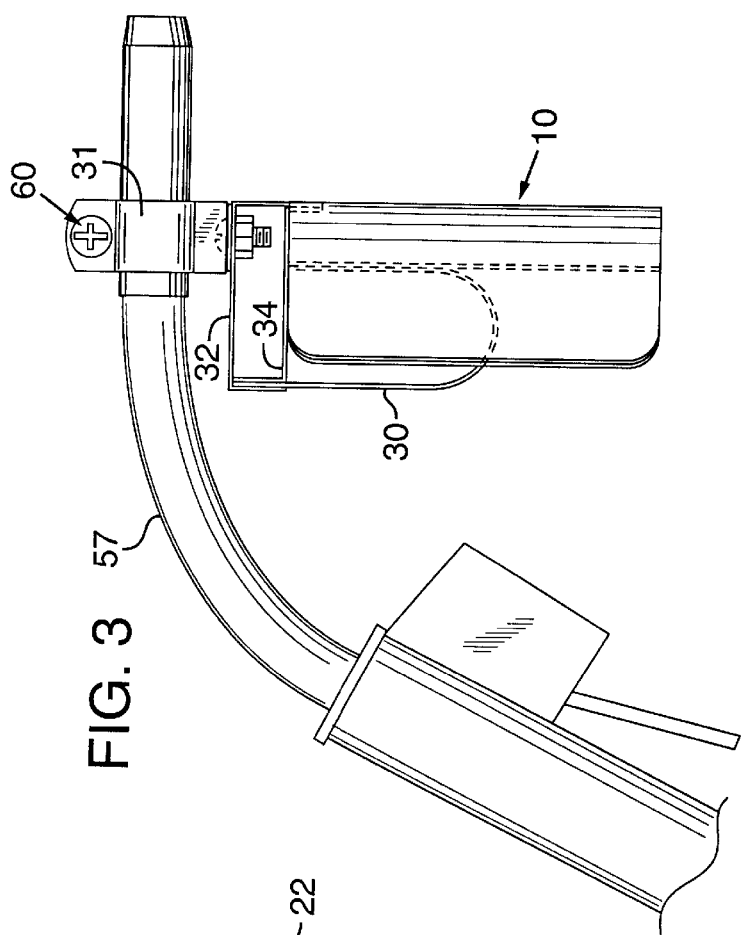
FIG. 3 is a side elevation view of the welding shield of FIG. 1 shown mounted on a MIG wire feed welding gun.

Referring to FIGS. 1–3, welding shield 10 is shown including a front plate 11 and a rear plate 12. The front plate 11 has an outer peripheral region 13 surrounding a middle region 14 (FIG. 4) with a contour defined by a radius of curvature 16 (FIG. 5). The bottom of front plate 11 is bent to produce a lip 18 to prevent the welding shield 10 from catching on rough welding slag as it moves over a work piece (not shown). The width of lip 18 is tapered as it approaches the side edges of the front plate 11 so that lip 18 does not extend out past rear plate 12. Both front plate 11 and rear plate 12 are rounded at the corners to prevent welding shield 10 from snagging on welding slag or other rough surfaces. Rear plate 12 has an outer peripheral region 22 surrounding a middle region 24 (FIG. 7) with a contour defined by a radius of curvature 26 (FIG. 8). The front plate 11 is attached to the rear plate 12 along their respective outer peripheral regions 13 and 22 preferably by spot welding although any method of secure attachment may by used. The radius of curvature 16 of the front plate 11 is smaller than the radius of curvature 26 of the rear plate 12, thereby producing an air channel 28 between front plate 11 and the rear plate 12 through which relatively cool room air is drawn during the welding operation. The curved shape of the front plate 12 and the rear plate 20 provide the welding shield 10 with a contour that reduces interference with the work piece and accommodates the user's hand.

Welding shield 10 is preferably made of a lightweight, heat conducting material that is relatively impervious to sparks and welding slag. Thus, the front plate 11 stops sparks and hot slag that destroys welding gloves and can burn a welder's hands. Preferred materials include 22 gauge steel, aluminum, stainless steel, or a high temperature plastic. The material of welding shield 10 is typically coated with high-temperature paint. One skilled in the art will recognize that the size of welding shield 10 can be varied to accommodate the size of the individual welder and the welding equipment used. In a preferred embodiment, welding shield 10 is approximately four inches (10 cm) high and approximately seven inches (17.8 cm) long. Radius of curvature 16 is approximately 5.91 inches (15 cm) and radius of curvature 26 is approximately 4.65 inches (11.8 cm).

The welding shield 10 includes a handle 30 for grasping by the welder for hand held use and a clamp 31 for use mounted on a welding instrument. The handle 30 is connected to the welding shield 10 through a clamp support 32 and a support bracket 34. The handle 30 is preferably U-shaped having opposed legs 36 and 38 (FIG. 10). Leg 36 is attached to the rear plate 12 and leg 38 is attached to an extension 40 of the clamp support 32 (FIG. 11). The clamp support 32 has another extension 42 that is attached to the back side of the front plate 11. The support bracket 34 (FIG. 12) provides strengthening support for the handle 30 and is attached to the handle 30 by an extension 44 while an opposed extension 46 is attached to the extension 42 of the clamp support 32. Clamp support 32 extends rearward from front plate 11 sufficiently to provide a handle width of approximately 1.3 inches (3.3 cm). The handle 30 has a length of approximately 2.25 inches (5.72 cm). The handle 30, clamp support 32 and support bracket 34 are preferably attached to the welding shield 10 by a weld. However, any method of secure attachment may be used.

In use, the welder may grasp the handle 30 between the opposed legs 36 and 38 with one hand while operating the welding instrument with the other hand. The welder may, if desired, support the welding instrument directly on the top 48 (FIG. 2) of the welding shield 10 for additional support and to ensure straight welds and cuts.

The welding shield 10 may be mounted on a welding instrument by the clamp 31 (FIGS. 3 and 14). The clamp 31 may be a standard, commercially available hanger clamp and may be attached to the clamp support 32 by a fastener 52 through one of two threaded openings 54 and 56 in the clamp support 32. The fastener 52 may be any type of standard fastener such as a nut and bolt. For mounting to a welding instrument such as a MIG wire-feed welding gun 57 the clamp 31 is secured to the forward most threaded opening 54 in the clamp support 32 (FIG. 1). When space is limited, such as for mounting the welding shield 10 to an oxyacetylene cutting torch 58 (FIG. 14) the clamp 31 is secured to the rearward most threaded opening 56 in the clamp support 32. Clamp 31 is rotatable and tightenable and can be used to change the angle and position of the welding shield 10 on the welding instrument. Although the clamp 31 is shown as being removably secured to the clamp support 32, it is understood that, if desired, the clamp 31 may be welded or otherwise permanently secured thereto. The clamp 31 may include a fastener 60 such as a nut and bolt for tightening the clamp 31 to the welding instrument. However, the fastener 60 may be eliminated so that the welding shield 10 can be snapped on and off of the welding instrument.

FIG. 15 shows airflow around welding shield 10 and through air channel 28. High temperature air 62 resulting from the welding operation is directed toward the welding shield 10. This air 62 heats room temperature air 64 causing it to rise through the air channel 28 from the bottom of the welding shield 10 and exit at the top. This allows the welder's hand and/or the welding instrument to be surrounded by cooler air 66.

The double wall construction of the welding shield 10 allows it to be lightweight and yet provides excellent protection from heat. Insulation could also be used, filling in part or in whole the air channel between the front plate and the rear plate.

Positioned between the welder's hand and the weld or cut, the welding shield 10 of the present invention protects its user from convective and radiant transfer of heat generated by the welding or cutting operation. The welding shield 10 protects the welder's hands, gloves, and welding equipment allowing the welder to work for longer periods without being rushed or without having to stop in the middle of the weld due to heat from the welding operation. Thus, the quality and consistency of the weld is improved. A welder can also weld at a higher temperature, if appropriate, without discomfort.

The light weight and hand conforming shape of the present invention makes it easy to use, while still providing both thermal and physical protection from heat, sparks, and slag. The double-walled construction of the preferred embodiment transfers heat away from the welder by using natural convection currents, thereby reducing the need for heavier or bulkier insulating material. The present invention also allows the welder to fixture off of the welding shield, thereby producing straighter welds.

It will be obvious to those having skill in the art that many changes may be made to the details of the above-described embodiment of this invention without departing from the underlying principles thereof. For example, although the double wall construction of the present invention produces certain advantages, the invention could be practiced using a single wall welding shield. Moreover, although insulation is not required in the present invention, insulation could be desirable in some embodiments that provided less thermal isolation of the welder's hand. The scope of the present invention should, therefore, not be limited to the preferred embodiment described above.

I claim:

1. A shield for protecting a welder and/or a welding instrument from heat, sparks and slag of a welding operation, comprising:

a front plate having a middle region, a peripheral region, and a contour defined by a first radius of curvature;

a rear plate having a middle region, a peripheral region, and a contour defined by a second radius of curvature that is greater than the first radius of curvature;

wherein the front plate is attached to the rear plate about a portion of their respective peripheral regions so that the middle region of the front plate is separated from the middle region of the rear plate to define an air channel for permitting air to pass between the front plate and the rear plate, thereby cooling the front plate and attenuating the transmission of heat to the rear plate.

2. The shield of claim 1 further comprising a handle attached to the rear plate and extending rearwardly therefrom.

3. The shield of claim 1 further comprising a clamp for permitting the shield to be attached to a welding instrument.

4. The shield of claim 1 wherein the peripheral region of the front plate extends toward the rear plate.

5. A method of protecting a welder and/or a welding instrument during a welding operation, comprising:

providing a shield including a front plate having a middle region, a peripheral region, and a contour defined by a first radius of curvature, a rear plate having a middle region, a peripheral region, and a contour defined by a second radius of curvature that is greater than the first radius of curvature wherein a portion of the rear plate peripheral region is attached to a portion of the front plate peripheral region so that the middle region of the rear plate is separated from the middle region of the front plate to define an air channel for allowing air to pass between the front plate and the rear plate, thereby cooling the front plate and attenuating the transmission of heat to the rear plate; and interposing the shield between the welding operation and the welder.

6. The method of claim 5 further comprising:

providing a handle for hand held use;

grasping the handle; and positioning the shield between the welder and the welding operation.

7. The method of claim 5 further comprising:

providing a clamp for mounting the shield on a welding instrument;

mounting the shield to the welding instrument by the clamp; and positioning the shield between the welding operation and the welder.

8. The method of claim 5 wherein the peripheral region of the front plate extends toward the rear plate.

* * * * *